United States Patent [19]

Crocker et al.

[11] 4,420,449
[45] Dec. 13, 1983

[54] PROCESS FOR PRODUCING ARTICLES FROM POLYTETRAFLUOROETHYLENE

[75] Inventors: Zenas Crocker, Osterville, Mass.; A. Nelson Wright, St. Agathe des Monts, Canada

[73] Assignee: Synergistics Chemicals Limited, Concord, Canada

[21] Appl. No.: 369,584

[22] Filed: Apr. 19, 1982

[51] Int. Cl.³ .............................................. B29C 19/02
[52] U.S. Cl. ..................................... 264/68; 264/122; 264/127
[58] Field of Search ........................... 264/127, 68, 122

[56] References Cited

U.S. PATENT DOCUMENTS

| | | | |
|---|---|---|---|
| 2,782,180 | 2/1957 | Weidman | 264/127 |
| 3,087,921 | 4/1963 | Mathews et al. | 264/127 |
| 3,262,834 | 7/1966 | Abell et al. | 264/127 |
| 3,266,738 | 8/1966 | Goeser et al. | 241/98 |
| 3,278,661 | 10/1966 | Beck | 264/68 |
| 4,230,615 | 10/1980 | Crocker et al. | 528/503 |

Primary Examiner—James R. Hall
Attorney, Agent, or Firm—Larson and Taylor

[57] ABSTRACT

A process for producing articles of polytetrafluoroethylene (PTFE) is disclosed. The process allows some of the conventional plastic fabrication techniques to be used with PTFE which until now have not been possible. The process comprises the steps of intensively mixing and thermokinetically heating PTFE resin in an enclosed container with a plurality of blades attached to arms rotating about an axis, with a blade tip speed of at least 30 meters/second, to a predetermined discharge temperature of above 370° C., discharging the resin at the discharge temperature, forming the resin into a desired shape at a temperature at or below the discharge temperature, holding the resin in the desired shape above a predetermined forming temperature for a predetermined time, and cooling the resin in the desired shape.

16 Claims, No Drawings

PROCESS FOR PRODUCING ARTICLES FROM POLYTETRAFLUOROETHYLENE

This invention relates to polytetrafluoroethylene (PTFE). More specifically, the invention relates to the production of articles made from PTFE in shorter times and by simpler methods than has been previously possible.

Because of its high and low temperature properties PTFE has many commercial uses. PTFE has a useful temperature range from −200° C. or lower, up to a maximum of 260° C. Production of articles is expensive as it has not been possible to use conventional plastic processing techniques. At the present time powder metallurgy processing techniques such as those used with metal alloys amd ceramics are applied to PTFE to produce molded products. In one embodiment PTFE granules are molded at pressures in the range of 2,000 to 10,000 psi followed by sintering at temperatures of about 380° C. PTFE products can be ram extruded at slow rates, but a processing aid, generally naphtha must be used, and it is then necessary to remove this processing aid by heating after the molding step. Most existing techniques produce a final product which is sintered and opaque, rather than fused, since the very high melting point of PTFE is close to the decomposition temperature. Furthermore, since there is no known solvent for this very stable polymer, it has not been possible to fabricate sheets, films, fryingpan coatings, etc. by solvent casting techniques. There are some exotic techniques such as photochemical processes that produce fusible or transparent forms of PTFE, but they are most suitable for specialized applications such as micro electronic parts. Processible perfluorinated polymers, such as fluorinated ethylene, propylene copolymer, have been introduced to the market place, but the useful range of temperatures is then reduced to about 200° C.

It has now been found that PTFE resins which are commercially available may be directly formed into articles of a desired shape by initially carrying out a high intensity mixing and heating process wherein the resin is intensively mixed and thermokinetically heated in a manner which controls thermal degradation and without shearing action occurring. One type of high intensity mixer is shown by Goeser et al in U.S. Pat. No. 3,266,738, published Aug. 16, 1966. This patent describes a high intensity mixer available on the market today, under the trade mark Gelimat, made by Draiswerke GmbH. The mixer includes a plurality of blades which rotate about an axis within an enclosed container. In the past, tip speeds have been in the order of up to 25 meters per second. Higher tip speeds have not generally been feasible because of problems controlling the temperature of the batch at the discharge. Tip speeds above 25 meters/second have recently been used in accordance with a control system as disclosed in U.S. Pat. No. 4,230,615, issued Oct. 28, 1980. According to this patent a system is provided for monitoring the batch temperature in the mixer, separately from the mixer temperature, and then discharging the batch from the mixer when the batch temperature reaches a final predetermined level. It has surprisingly been found that PTFE resins may be first processed in a high intensity mixer having blade tip speeds of at least 30 meters/second and preferably 40 meters/second or higher. In this process the resin is intensively mixed and thermokinetically heated to the desired forming temperature which is above 370° C. and preferably 450° C. or higher. To reach this temperature range the mixing step requires a period of time in the order of 1–2 minutes.

After the heated unstabilized resin is discharged from the high intensity mixer it must be processed or formed into an article before the material cools. In the form it exits from the high intensity mixer it may be processed directly by some conventional or modified plastic fabrication techniques, such as compression molding, transfer molding, forging, stamping, ram extrusion or pressing into the desired shape and thickness.

Fabricated articles produced by the process of the present invention have physical properties at least as good as those articles produced by conventional methods.

The present invention provides, a process for production of an article of a desired shape formed from polytetrafluoroethylene, comprising the steps of, intensively mixing and thermokinetically heating polytetrafluoroethylene resin in an enclosed container with a plurality of blades attached to arms rotating about an axis, with a blade tip speed of at least 30 meters/second, to a predetermined discharge temperature of above 370° C.; discharging the resin at the discharge temperature; forming the resin into the desired shape at a temperature at or below the discharge temperature within a time such that degradation does not occur; holding the resin in the desired shape above a predetermined forming temperature for a predetermined time, and cooling the resin in the desired shape.

In preferred embodiments, the blade tip speed is about 40 meters/second and the predetermined discharge temperature is at least about 450° C. With a blade tip speed of about 35 meters/second and a discharge temperature of about 450° C. the mixing and heating step takes about 80–120 seconds. When the blade tip speed is about 40 meters/second and the discharge temperature in the range of about 475°–480° C. the mixing and heating step takes about 60–80 seconds.

In a further embodiment the article is a sheet of polytetrafluoroethylene and the forming step is pressing. The pressing occurs between hot plates at a temperature of at least about 150° C. and a pressure of at least about 320 psi, the pressing step lasts for about 3 minutes, followed by a cooling step for about 2 minutes. In another embodiment the total processing time for making the article is in the range of about 6–7 minutes.

Commercial grades of PTFE resin, generally in granular form, may be processed without additives, or may include additives for stabilization. Additives such as pigments may be added for colour as desired.

High intensity mixers are known for processing thermoplastic and thermosetting materials. Reference is made to U.S. Pat. No. 4,230,615 which discloses a control system utilizing a high intensity mixer. Ultra high molecular weight polyethylene articles may be processed in a high intensity mixer, as disclosed in U.S. Pat. No. 4,272,474. The Gelimat, one example of a high intensity mixer, is satisfactory for operating the present process. Such a mixer has a plurality of blades attached at the end of arms radiating from a central axial shaft which rotates within an enclosed container. Variation in the speed of the rotating shaft changes the blade tip speed and in the present invention it is found that blade tip speeds of 30 meters/second and higher are satisfactory. The Gelimat high intensity mixer may be of the screw feed design having a feed screw at one end which feeds resin into the mixer, or may be of the stop-start type which includes an input hatch at the top of the container, which is opened to feed material into the mixer. In both cases, in order to empty the mixer there is an exit flap which opens to permit the batch of material processed in the mixer to be dropped out and removed for further processing.

As disclosed in U.S. Pat. No. 4,230,615, the mixer is preferably fitted with a system for monitoring the infrared radiation from the batch and hence temperature of the batch in the mixer separately from the temperature of the mixer walls and blades. The batch is discharged from the mixer when the batch temperature reaches a predetermined level. The measurement of the temperature of the batch by infrared radiation is instantaneous and is quite unrelated to the temperature of the mixer walls or blades. When the batch reaches the predetermined discharge temperature, the exit flap of the mixer opens and the batch is discharged for further processing. The energy from the high speed rotating blades in the mixer body intensively mix and thermokinetically heat the PTFE resin batch. As the control of the mixing and heating step is by temperature, it is found that the time of each batch can vary slightly due to a number of reasons, however, the state of each batch and its discharge temperature are constant.

In a series of tests, batches of PTFE resin ranging from 200–300 grams were processed in a Gelimat high intensity mixer having a capacity of 1.4 liters. The temperature of each batch was measured using an infrared monitoring system which determined the infrared radiation of the resin in the mixer through an optical fiber system. The system was capable of accurate temperature measurement in the range from 160°–600° C. The temperature of the batch discharging from the mixer was also measured with a pocket probe digital pyrometer fitted with a needle-nose probe. The time in seconds from introduction of the resin to the mixer until discharge, was measured with a stopwatch. Tests were carried out with the mixer having blade tip speeds of approximately 35 meters/second and 40.5 meters/second.

The batches of PTFE hot resin discharging from the Gelimat high intensity mixer were immediately pressed into sheets having a thickness of approximately 0.12 inches. The press plates were steam heated to temperatures of 170° C. with the frame preheated to temperatures of up to 200° C. to avoid too great a thermal quenching effect. Thus, the temperature of the PTFE batch in the press was below the discharge temperature from the mixer. Pressures in the press were as low as 320 lbs./sq. inch. The pressing cycle lasted for approximately 3 minutes at the raised temperature, followed by an approximately 2 minute cooling phase, during which time water was circulated through the press to cool the plates. Whereas the tests carried out where for substantially thin sheets, the limitations on the press were limitations of existing equipment, larger sheets and articles could be more easily formed in presses or molds heated to temperatures closer to the discharge temperature of the resin.

The properties of the pressed sheets from PTFE were tested by standard measurement techniques. The specific gravity was measured by water displacement, hardness tests and tests for dielectric response were carried out, and a differential scanning calorimeter (DSC) was used for determining melting points at both heating and cooling rates of 20° C. per minute. In the DSC tests, after the first heating cycle, the sample was maintained above the melting point for approximately 5 minutes before the cooling cycle commenced and then held at approximately 45° C. for 5–10 minutes before the second heating cycle was begun.

Typical processing details for tests of PTFE batches utilizing a screw feed 1.4 liter Gelimat high intensity mixer with a tip speed of 40.5 meters/second and at a batch weight of approximately 300 grams are given below.

TABLE I

| Test | 1 | 2 |
| --- | --- | --- |
| Mixer temperature before batch added | 257° C. | 329° C. |
| Time to reach predetermined temperature in mixer | 62 sec. | 77 sec. |
| Temperature of batch after discharge measured by pyrometer | 475° C. | 480° C. |

Batches were pressed into sheets immediately after discharge from the mixer. The total time from the introduction of the resin batch into the mixer to the end of the cooling cycle for the sheet, was in the order of 6–7 minutes. Samples produced in these tests were analyzed to determine their physical properties and compare these physical properties against PTFE articles made by conventional methods.

Table II sets out the results of the physical property analysis.

TABLE II

| | Conventional Product Values | Test No: 1 | Test No: 2 |
| --- | --- | --- | --- |
| Specific Gravity | 2.14–2.20 | 2.20 | 2.17 |
| Hardness (D-Scale) | 50–55 | ~50 | ~50 |
| Dielectric Content | 2.1 | ~2 | ~2 |
| Dielectric loss factor (Tan δ) | Low | Low | Low (Not Measurable) |
| Limiting Oxygen Index (LOI) | High | >80 | >80 |
| Melting Point (°C.) | 327–330 | 328.5 | 333.6 |

The measurement of the melting points was carried out on a Perkin Elmer Model 2C differential scanning calorimeter, the readings are taken from the second heating cycle. The melting points increased from the first heating cycle to the second heating cycle by 1° and 2.2° C. For the first and second tests respectively. When the melting points of a commercially available sheet of PTFE was measured on the DSC it was found that the melting point for the second heating cycle decreased by approximately 0.5° C. This would indicate that the mixing and heating step causes the PTFE resin to pass through an effective melt stage so that the crystalline state of the processed resin is closer to the equilibrium condition of the material.

As indicated by the tests, the physical properties of the PTFE articles produced by the process of the present invention, are as good if not better than sheets of PTFE produced by conventional methods.

Tests run at discharge temperatures of less than 370° C. could be pressed following discharge from the mixer, but had little integrity and retained a very sintered whitish appearance. Tests carried out with blade tip speeds in the mixer of less than about 30 meters/second produced batches that could be pressed into sheets, however, the sheets were hand breakable. When precise temperature measuring capability above 450° C. was not available and longer processing times in the mixer were run, then a free-flowing melt was produced that in some cases burst spontaneously into flames and gave off obnoxious fumes despite the polymer's known resistance to combustion in air.

Whereas pressing into sheets is the only further processing step in the forming of articles of PTFE resis disclosed herein, it will be obvious to those skilled in the art that some other types of conventional processing of plastic materials may be carried out with the output from the high intensity mixer. provided it is processed immediately after discharge from the mixer.

In one instance the PTFE resin discharged from the mixer is formed into a billet which is cooled to a temperature suitable for forming into a finished article by direct stamping or forging. In another embodiment the resin is discharged from the mixer directly into a compression moulding step. The forming may also occur in a ram extruder.

PTFE applications include coatings on a substrate. This application is particularly useful because of the chemical resistant properties and heat properties of PTFE.

Various amendments may be made to the process defined herein without departing from the scope of the present invention, which is limited only by the scope of the claims.

The embodiments of the invention in which an exclusive property or privilege is claimed are defined as follows:

1. A process for production of a shaped polytetrafluoroethylene article comprising:

introducing polytetrafluoroethylene granules into a high intensity mixer comprising an enclosed container having a plurality of blades rotatable on arms about a central axis;

rotating said blades at a blade tip speed of at least 30 meters per second whereby the polytetrafluoroethylene granules are subjected to an intense mixing and thermokenetic heating action of the rotating blades until the granules become heated to a predetermined discharge temperature of above 370° C.;

discharging the polytetrafluoroethylene granules at said discharge temperature;

forming the discharged, heated, granules into an article of desired shape at or below said discharge temperature; and cooling the shaped article.

2. The process according to claim 1 wherein the blade tip speed is at least about 40 meters/second.

3. The process according to claim 1 wherein the predetermined discharge temperature is at least about 450° C.

4. The process according to claim 3 wherein the blade tip speed is about 35 meters/second, the predetermined discharge temperature is about 450° C. and the time period for the mixing and heating step is in the range of about 80–120 seconds.

5. The process according to claim 3 wherein the blade tip speed is about 40 meters/second, the predetermined discharge temperature is in the range of about 475°–480° C. and the time period for the mixing and heating step is in the range of about 60–80 seconds.

6. The process according to claim 1 wherein the article comprises a sheet of polytetrafluoroethylene and the forming step comprises pressing the dischanged resin between platens to form said sheet.

7. The process according to claim 6 wherein the pressing step occurs between hot plates at a temperature of at least about 150° C. at a pressure of at least about 320 psi, the pressing step occurring for about 3 minutes followed by the cooling step occurring for about 2 minutes.

8. The process according to any of claims 1, 6 or 7 wherein the total processing time for making the article is in the range of about 6–7 minutes.

9. The process according to claim 1, including the addition of pigments and/or other additives to the polytetrafluoroethylene resin for the mixing and heating step.

10. The process according to claim 1, wherein the forming takes place in a press and the desired shape is a coating layer on a substrate.

11. The process according to claim 1, wherein the desired shape is a billet which is cooled to a temperature suitable for forming into a finished article by direct stamping or forging.

12. The process according to claim 1 wherein the resin is discharged from the intensive mixing step directly into a compression moulding step.

13. The process according to claim 1 wherein forming comprises extruding the discharged resin in a ram extruder.

14. The process according to claim 1 wherein the article formed into desired shape is held at an elevated temperature above a predetermined forming temperature prior to cooling the shaped article.

15. The process according to claim 14 wherein said predetermined forming temperature is at least 150° C.

16. The process according to claim 14 wherein said predetermined forming temperature is at least 170° C.

* * * * *